Jan. 29, 1963
V. H. HIERS
3,075,447
PHOTOGRAPHIC FILM TREATMENT TABLE
Filed Aug. 17, 1959
4 Sheets-Sheet 1
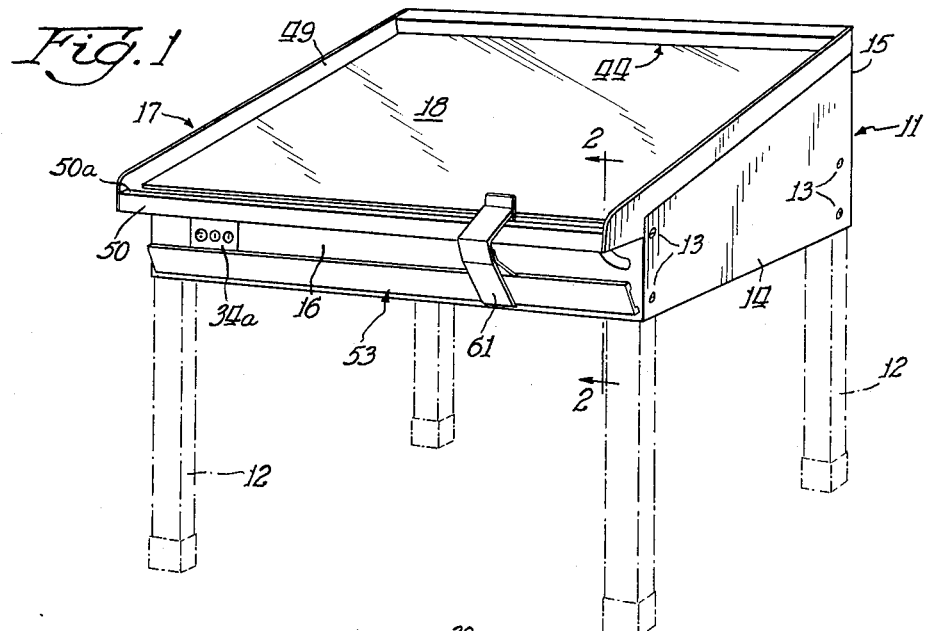
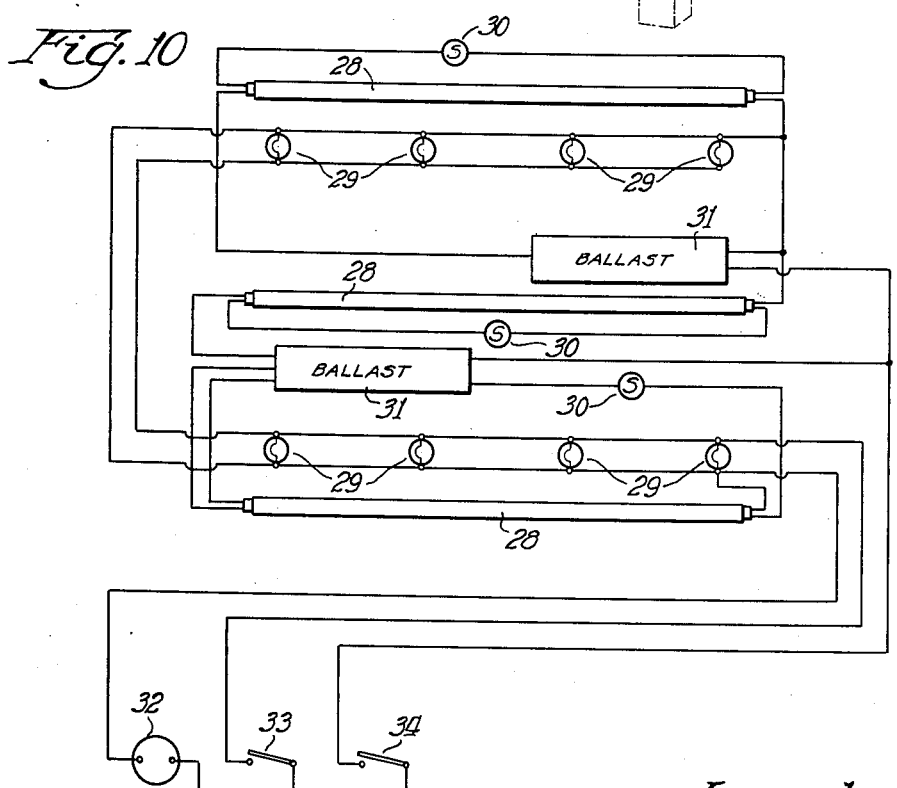
Inventor:
Victor H. Hiers
By: Jones, Darbo & Robertson
Attys.

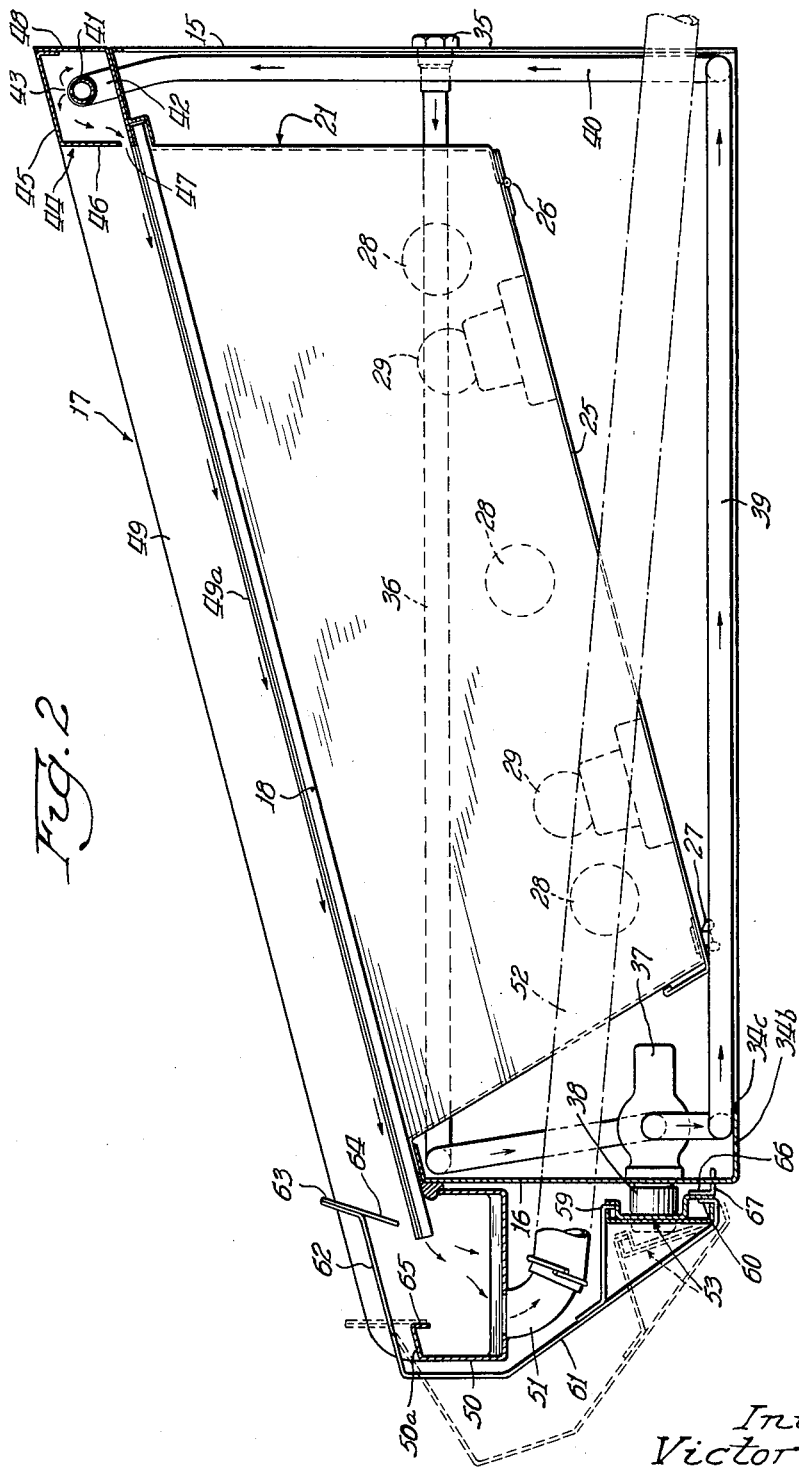

Jan. 29, 1963  V. H. HIERS  3,075,447
PHOTOGRAPHIC FILM TREATMENT TABLE
Filed Aug. 17, 1959  4 Sheets-Sheet 3
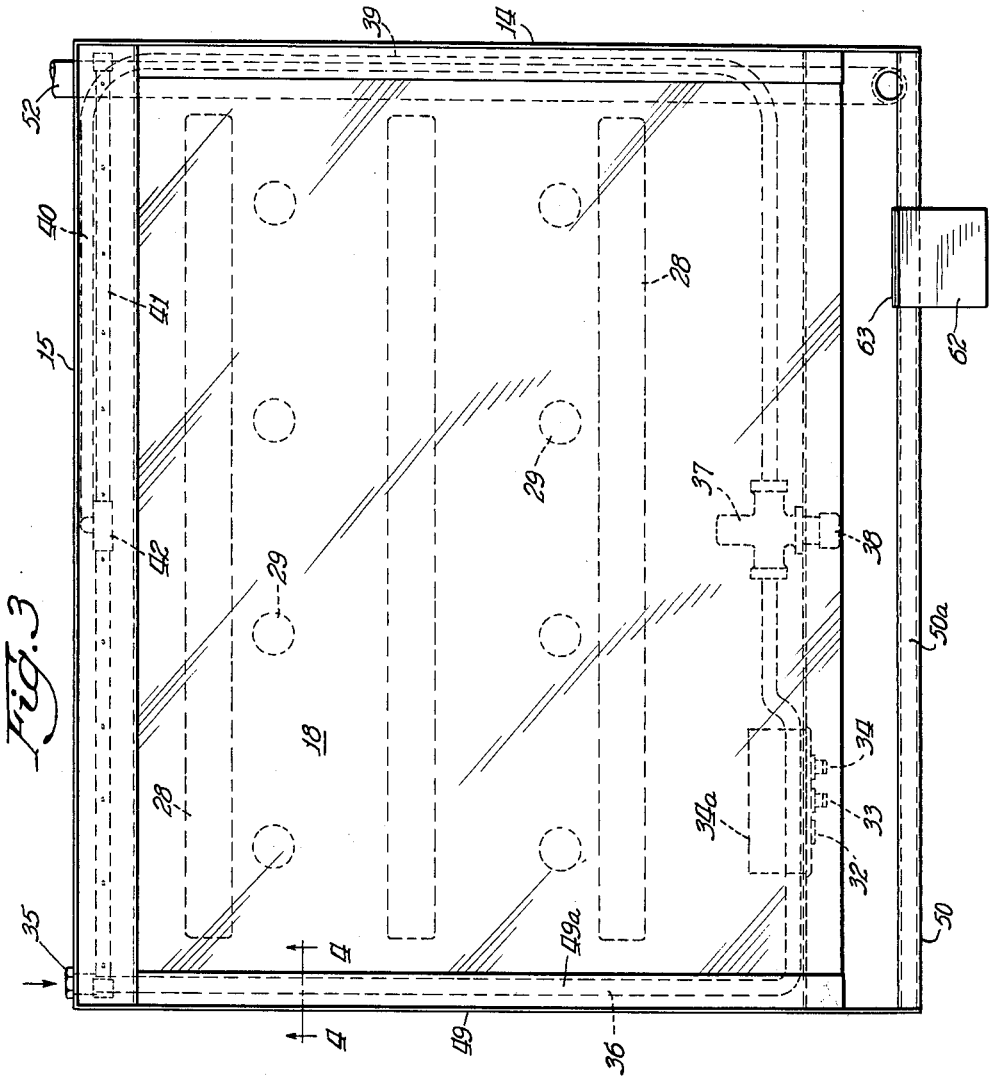
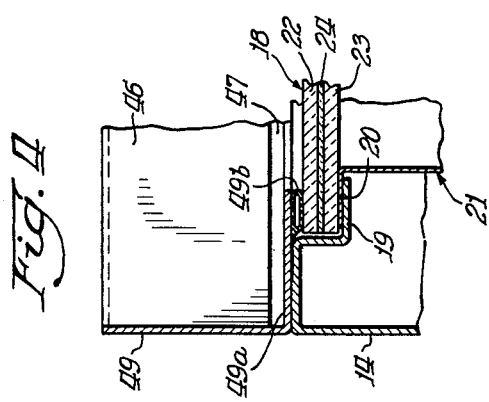
Inventor:
Victor H. Hiers
By: Jones, Dasho + Robertson
Attys.

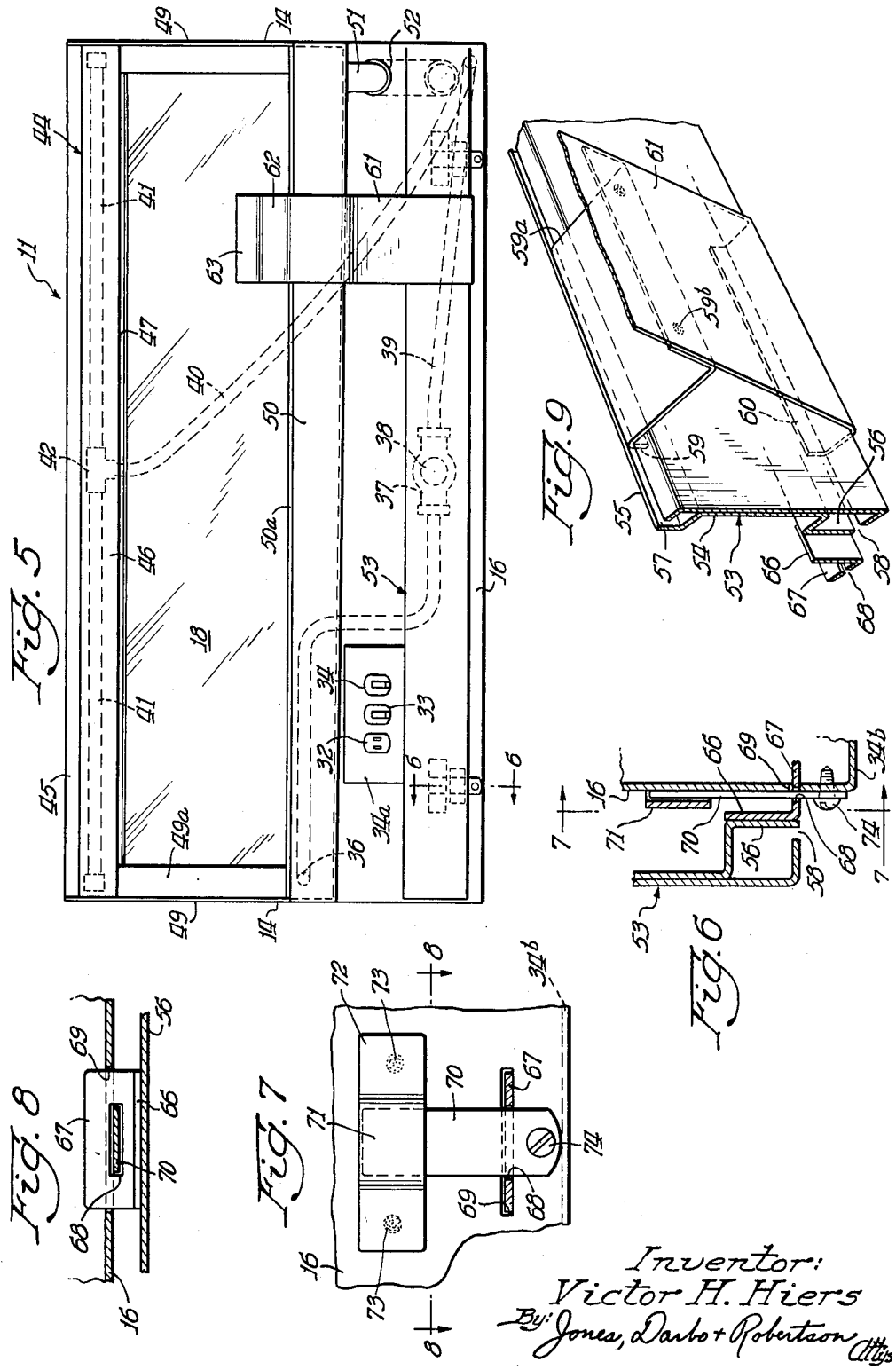

United States Patent Office 3,075,447
Patented Jan. 29, 1963

3,075,447
PHOTOGRAPHIC FILM TREATMENT TABLE
Victor H. Hiers, Two Rivers, Wis., assignor to Hamilton Manufacturing Company, Two Rivers, Wis., a corporation of Wisconsin
Filed Aug. 17, 1959, Ser. No. 834,157
11 Claims. (Cl. 95—102)

This invention relates to photographic film treatment table more particularly such as is commonly known as a "dot etch" table employed in the photolithographic printing industry for hand treatment or touching up of the developed or partially developed photographic film prior to the reproduction of the negative image from the film onto a light sensitized planographic plate. Other uses include so-called strip filming (either wet or dry) which involves the preparation of a base negative carrying reading matter, for example, with interspersed predetermined clear areas onto which areas picture negatives may be superimposed to make up the final negative.

In the highly critical work of retouching by hand photographic film which may be only partially developed, to bring up more sharply certain portions thereof or to wash out certain effects, and where developers or chemicals may be employed, the use of red light is necessary so as to avoid the actinic effect of white light on the sensitized film. At the same time, a spray or flush of water is selectively applied over the film to stop the action of chemicals on the film emulsion. In the strip film process, on the other hand, involving locating areas of film relatively to each other, a white light is desirable, which will merely emphasize the lights and shadows and provide illumination for accurately registering the superimposed areas.

The present invention provides a table of this class carrying white lights, in this instance in the form of fluorescent tubes, and red lights, here shown in the form of incandescent bulbs, that may be readily alternately or selectively turned on to sub-illuminite, that is, to create illumination below, the translucent inclined panel of the table.

A further object of the invention is the provision of such a table with an improved water spray means that eliminates splashing and bubbling and that creates a uniform sheet of water over the surface of the translucent panel and film.

An important aspect of the invention resides in the provision of on-and-off control means for the water spray that is accessible at any point along the front edge of the table, and that, furthermore, desirably includes a push-plate lever that may be contacted either by the hand or abdomen of the operator to turn the water on, the water being turned off when the lever is released.

Another important object is the incorporation of all of the foregoing features of the table in the upper part thereof, above the legs, if any, so that the table may be used either as a bench or floor model, its use as a bench model importing the omission of the legs while at the same time the legs may be readily applied, being attachable for the purpose, if it is desired to convert a bench model to a floor model, and in either case ready access to the lights being assured.

The foregoing, and other objects and advantages, will be apparent from the following description, taken together with the accompanying drawings, showing an illustrative embodiment of the invention, and in which drawings:

FIGURE 1 is a perspective view of the table generally, showing optional legs in broken lines;

FIGURE 2 is an enlarged cross-sectional view of the table taken on the line 2—2 of FIG. 1;

FIGURE 3 is a plan view thereof;

FIGURE 4 is a further enlarged fragmentary section taken on the line 4—4 of FIG. 3;

FIGURE 5 is a front view of the table, somewhat in phantom for purposes of description;

FIGURE 6 is an enlarged fragmentary cross-section taken on the line 6—6 of FIG. 5;

FIGURE 7 is a fragmentary section taken on the line 7—7 of FIG. 6;

FIGURE 8 is a section taken on the line 8—8 of FIG. 7, but also showing parts not shown in FIG. 7;

FIGURE 9 is a still further enlarged perspective partial view of the valve operating means; and FIGURE 10 shows one operative electrical wiring diagram for the table.

Referring in detail to the illustrative construction shown in the drawings, the numeral 11 indicates the table as a whole, which may or may not be provided with the legs 12. Screws 13 passing through the table side into the legs may be employed in the attachment of the legs if the latter are desired. With the legs 12 the table would constitute what is referred to as a floor model while without the legs the table itself may be disposed on another table or the like as a so-called bench model. Preformed holes in the legs facilitate assembly or disassembly for the purpose just referred to, or for knock-down shipment where desired.

The table 11 is box-like in construction, constituting a housing having the sides 14, rear face 15 and front face 16, the rear face 15 being higher than the front face 16 so that the frame-like top 17 slopes downwardly from rear to front so as to inclinedly carry the translucent glass panel 18. Panel 18 is carried by the inturned bezel-like portion 19 of the top 17 that also serves as a support for the outwardly flaring flanges 20 of a lights pan 21 that is also inclined to correspond with the panel and is spaced from the side walls and front and rear faces of the table.

As best seen in FIG. 4, the translucent panel 18 is preferably of laminated glass having the outer panes 22 and 23 and an intermediate interlay 24 of plastic material such as an adhesive synthetic resin and a pigment homogeneously dispersed in the resin to an extent to render the panel 18 non-transparently translucent with uniform density, as disclosed in copending application of Kent B. Waterpool Serial No. 758,204, filed September 2, 1958, now abandoned. The pigment in this instance is advantageously of white color. An outer face of at least one of the glass panes, is desirably mildly etched to contribute to light diffusion somewhat as in the case of so-called opal glass.

The lower wall or bottom 25 of the pan 21 is desirably hinged as at 26 and has a thumb nut lock 27 at its other margin. The pan bottom wall 25 carries illuminating means for the table such as in this instance the three white light fluorescent tubes 28 and the eight red light incandescent bulbs 29 uniformly spaced with respect to the panel 18. The fluorescent tubes 28 have the usual starting devices 30, one for each tube, and ballasts 31, two of the latter for the three tubes. An illustrative electrical wiring diagram is shown in FIG. 10 that includes a plug-in socket 32 for a utility line connection, the switch 33 for the bulbs, and the switch 34 for the fluorescent tubes, conveniently accessible at the front of the table as best seen in FIG. 5 and carried by a box 34a (FIG. 3). The lower wall or bottom 34b of the table is advantageously cut away as at 34c to permit ready access to the lights pan 21. The pan bottom 25 can be dropped through the opening 34c for this purpose.

The table may be connected to a water source, such as water coming from the city main, by a connection 35 (FIG. 2), from whence the water flows by tube 36 to a valve mechanism 37. The valve mechanism 37 is desirably of the push-button type having a button 38 that is urged outwardly by any suitable internal spring (not shown). Since this type of valve is readily procurable on the market, it is believed unnecessary to describe it further except to say the button 38 may be pressed to open the valve, the latter closing under the influence of the spring when pressure on the button 38 is relieved. Valve mechanism 37 is between the pan 21 and the front wall 16, and the push-button 38 of the valve mechanism projects beyond the wall 16 through an opening in the latter for the purpose. From the valve mechanism 37 the water flows through the tube 39 along the bottom of the table and upwardly through the tube 40 to a spray pipe 41 that is connected with the pipe 40 by a T 42. The spray pipe 41 runs along the upper rear edge of the table and is provided with a multiplicity of perforations 43 spaced therealong through which water is ejected or jetted under line pressure when valve mechanism 37 is opened. Further, in accordance with the present invention, the spray pipe is hooded by a shield 44 having an upper wall 45 over the pipe 41 and a vertical wall 46 depending from the wall 45 and spaced at its lower edge as at 47 from the panel 18. Perforations 43 face upwardly so that the spray is directed first against the shield top 45 and then travels downwardly to the opening 47. Shield 44 which is shown supported by top frame 17, prevents splashing of water from the pipe 41 onto the panel 18 as well as onto the operator, and restrictive opening 47 along the lower front edge of the wall 46 of the shield serves to bring the water to a thin uniform sheet as it impinges upon the panel 18 and flows downwardly thereover under the influence of gravity to the drain trough 50 at the front edge of the table.

The top frame 17 of the table includes a guard rim having a rear upstanding element 48 and sides 49 that retain the water as it flows over the panel 18. The side guards also have an inturned flange 49a that serves to hold the panel 18 onto its bezel 19 through intermediation of gasket 49b. Gasket 49b is desirably formed of urethane foam with a vinyl covering, thus providing a good liquid seal as well as neatness of appearance. Water leaving the panel 18 drops into the trough 50 and flows therefrom through an elbow 51 and plastic tube 52 to the drain. As best seen in FIG. 2, panel 18 is of a dimension sufficient to overhang the trough 50 to facilitate this flow. Trough 50 at its front edge has an inturned overhanging flange 50a.

Just as the trough 50 extends across the entire front of the table, so, below the trough is a valve button actuator rail bar 53 that also extends across substantially the entire front of the table, below the socket and the switches for the electric circuit. Valve button actuator bar 53 is of channel form and on its rear face has secured as by welding a marginally flanged plate or lamination 54 that has the flanges 55 and 56 along its upper and lower margins respectively. The flanges 55 and 56 cooperate with the channel walls of the bar 53 to define slots 57 and 58, one along the upper edge of the bar and one along the lower edge of the bar for the inturned terminations 59 and 60 of a push-plate 61 that slides in the slots 57 and 58 from side to side of the table. Push plate termination 59 is provided by a web piece 59a that is welded as at 59b to the bulged out portion of the push-plate (FIGS. 2 and 9). Push-plate 61 is of a return-bend formation and has an overhanging handle part 62 that terminates in a finger piece 63. Finger piece 63 has a downward extension 64 that provides a detent member cooperating with the overhanging edge flange 65 of the trough 50 to limit outward movement of the push-plate 61 under the influence of the valve button 38 acting upon the push-plate through the button actuator bar 53.

Valve button actuator bar 53, together with the slidable push-plate 61 carried by the bar, is hingedly mounted along the front edge of the table by a bracket 66 that is welded to the flanged margin 56 of the bar lamination 54. Bracket 66 has a foot portion 67 that is slotted as at 68 and that is entered into a slot 69 in the table front 16. After the bracket foot 67 is passed through the slot 69, a tab 70 is passed upwardly through the slot 68 in the bracket foot 67 and entered behind a retainer strap 71, the offset ends 72 of which are welded as at 73 to the front wall 16 of the table above the bracket 66. Tab 70 is held in the slot 68 and retainer strap 71 by a screw 74 passing through the lower end of the tab and into the wall 16. In this instance there are two of the brackets 66 for hinging the bar 53, spaced apart across the front of the table, as best seen in FIG. 5.

Since the fit of the bracket foot 67 in the slot 69 and of the tab 70 in the slot 68 are not tight, the bracket foot 67 may rotate in the slot 69 on the tab 70 thereby giving a hinge action to the bracket 66 and with it the valve button actuator bar 53 and push-plate 61. As previously referred to, the valve button actuator bar and with it the pusher plate 61 will be rotated outwardly by the outwardly spring urged valve button 38 to the dotted line position shown in FIG. 2, there limited by detent 64 engaging stop 65, to shut off the water.

When the operator desires to open the valve mechanism 37 to permit water to flow over the panel 18 the operator may push inwardly on the valve actuating bar at any point therealong, or, more conveniently, by use of the plate 61, to move the parts to the full line position shown in FIG. 2, thereby depressing or urging inwardly the valve button 38 to open the valve and to permit water to flow through the tubing, including a thin sheet of water over the panel 18 and over any photographic film being treated on the panel. One advantage of the outwardly bulged push-plate 61 is that the operator may use abdominal pressure to push it inwardly, thus leaving the hands of the operator free for other purposes. To facilitate pushing of the push-plate 61 by the abdomen of the operator the push-plate is slidable along the valve button actuator bar as already described so that it may be located at any point along the front part of the table that will accommodate the position at which the operator is standing at the moment. The push-plate is rigid with the valve actuator bar transversely of the latter but is movable therealong for the adjustment purposes referred to, as on a rail.

So constructed and arranged, a markedly useful film treatment table is provided that expedites the work of the operator while facilitating treatment of the photographic film for the purposes herein referred to. A two-in-one table affording both white light and red light usefulness, a readily induced on-and-off controlled spray flush, and adaptable as either a floor or bench model, all in one compact housing, makes it specially attractive to a small printing concern with limited capital.

One embodiment of the invention having been described, in accordance with the statutes, it is to be understood that the invention is not intended to be limited to details of construction shown for purposes of illustration. Furthermore it may not be essential in all uses of the invention that all features thereof be used conjointly, since various combinations and sub-combinations may at times be advantageously employed. Such changes may be made, including modifications or additions, as fall within the scope of the appended claims without departing from the invention.

What is here claimed is:

1. In a film treatment table, the combination with a sub-illuminated translucent inclined panel, of piping carried by the table below the panel and including a liquid spray pipe along the top edge thereof, a shield over the pipe, valve mechanism in said piping at the forward edge of the table, a valve button on said valve mechanism normally outwardly urged to close the valve, an elongated valve actuator bar along said forward edge adapted to press the valve button to open the valve, and a push plate lever rigid with said actuator bar in a direction to close and open the valve but slidable on the bar from side to side of the table.

2. The structure of claim 1 wherein the panel is of laminated glass having a pigmented interlay to render the panel non-transparent and etched on at least one surface thereof to contribute to the light diffusion properties of the panel.

3. The structure of claim 1 wherein the table carries white fluorescent tubes and red incandescent bulbs below the panel.

4. In a film treatment table, the combination with a sub-illuminated translucent inclined panel, of piping carried by the table below the panel and including a liquid spray pipe along the top edge thereof, valve mechanism in said piping at the forward edge of the table including a valve button, said valve button being normally outwardly urged to close the valve, an elongated valve actuator bar along said forward edge adapted to press the valve button to open the valve, and a push-plate lever rigid with said actuator bar in a direction to close and open the valve but slidable on the bar from side to side of the table.

5. In a film treatment table, valve mechanism having an outwardly spring pressed push button movable inwardly against the force of the spring to open the valve, a valve button actuator bar hinged to the table across the front thereof below said button and swingable to contact the button depress and release the button, a pusher plate carried by the bar projecting outwardly therebeyond, and a drain trough arranged along the front of the table, said pusher plate being rigid with the bar transversely thereof but being slidable along the bar to accommodate the position of the operator, said pusher plate overhanging said trough and carrying a depending detent engageable with the front wall of said trough to limit outward movement of the pusher plate.

6. The structure of claim 5 wherein the actuator bar has a lamination secured thereto having flanged upper and lower margins providing a pair of slots along the upper and lower edges of said actuator bar and the pusher plate has inwardly directed flanges entering said slots respectively to permit sliding movement of the pusher plate along said bar from side to side of the table across the front thereof.

7. The structure of claim 6 wherein the upper inwardly directed flange of the pusher plate is provided by a web piece secured to the pusher plate intermediately there of the latter, the pusher plate being bulged out where the web piece is connected thereto and being of return bend formation whereby to overhang said trough.

8. In a film treatment table including a sub-illuminated translucent panel valve mechanism having an outwardly spring pressed push button movable inwardly against the force of the spring to open the valve, a valve button actuator bar hinged to the table across the front thereof below said button and swingable to contact the button to depress and release the button, a pusher plate carried by the bar projecting outwardly therebeyond, said pusher plate being rigid with the bar transversely thereof but being slidable along the bar to accommodate the position of the operator, a drain trough along the upper front margin of said table above said actuator bar, a spray pipe along the back margin of the table, a shield over said spray pipe, and piping including said valve mechanism and said drain trough for delivering water to said spray pipe from a water main over said panel and returning it to the drain, said panel being inclined downwardly from said spray pipe to said trough and overhanging the latter.

9. The structure of claim 8 wherein the table carries a lights pan below said panel for red and white lights and the bottom wall of the pan is hinged for access thereto, the table bottom wall being cut out to permit said access.

10. The structure of claim 8 wherein a seal is provided between the panel and the table comprising an urethane foam and a vinyl covering for the foam.

11. In a film treatment table, the combination with a table supported sub-illuminated translucent inclined panel, of piping carried by said table, including a liquid spray pipe along the top edge thereof to eject a liquid against a shield over said spray pipe to provide a sheet of liquid to be gravity fed over said panel, a valve mechanism connected to said piping to initiate and interrupt the liquid supply to said spray pipe, a pan below said panel carrying white and red lights to sub-illuminate said translucent panel, and means to selectively illuminate said lights.

References Cited in the file of this patent

UNITED STATES PATENTS

| | | |
|---|---|---|
| 437,631 | Spiro | Sept. 30, 1890 |
| 884,922 | Hayden | Apr. 14, 1908 |
| 1,341,146 | Murray | May 25, 1920 |
| 2,215,462 | Davidson | Sept. 24, 1940 |